Sept. 17, 1940.  J. N. KIEP ET AL  2,214,819
VARIABLE-SPEED POWER-TRANSMISSION MECHANISM
Filed Dec. 23, 1938  3 Sheets-Sheet 3
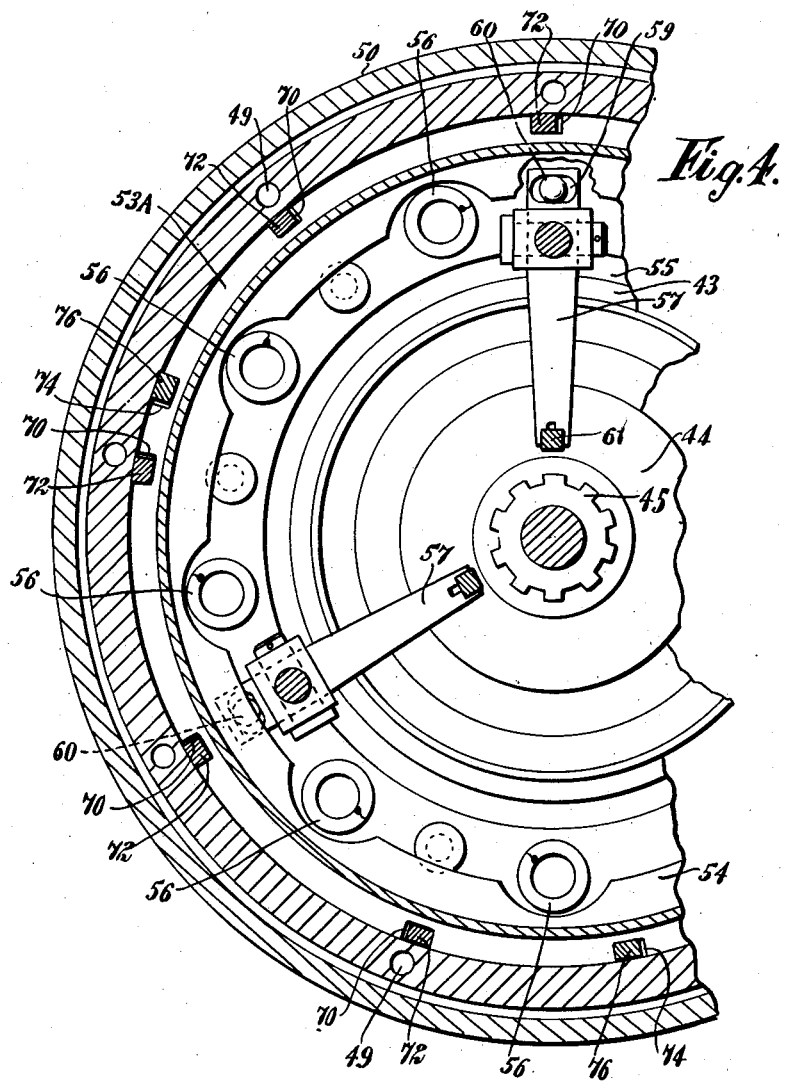
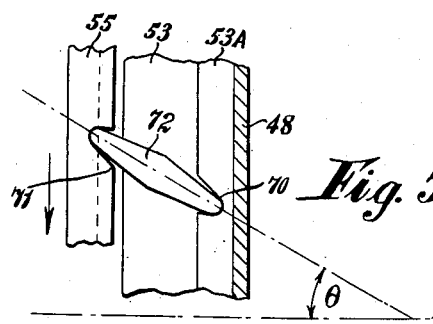
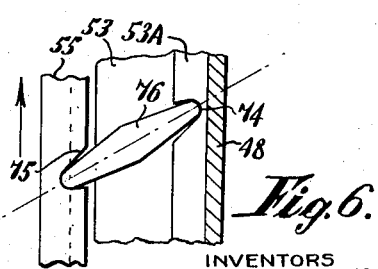
INVENTORS
Johann Nikolaus Kiep
Harold Sinclair
BY
Dean Fairbanks & Hirsch
ATTORNEYS Patented Sept. 17, 1940

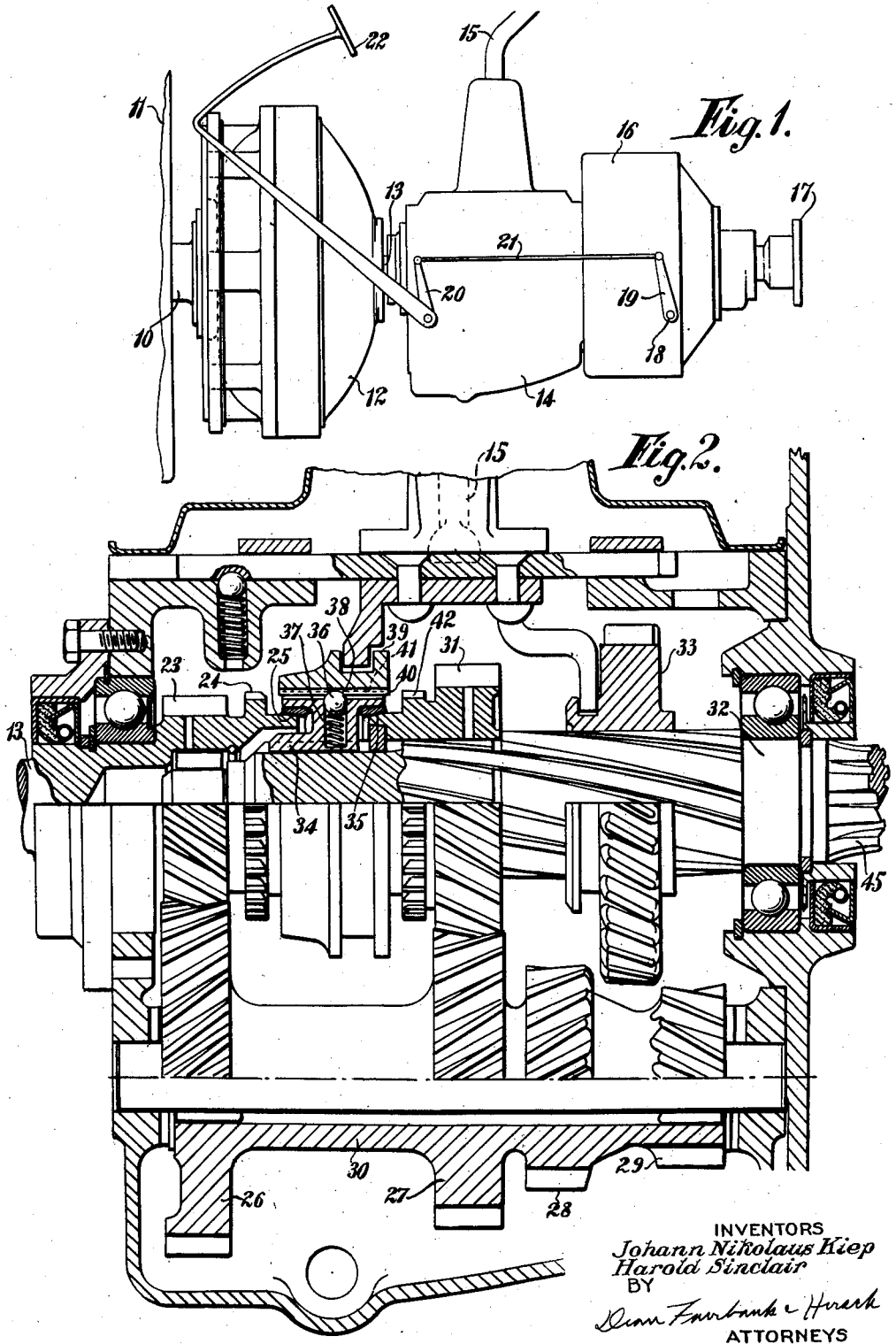

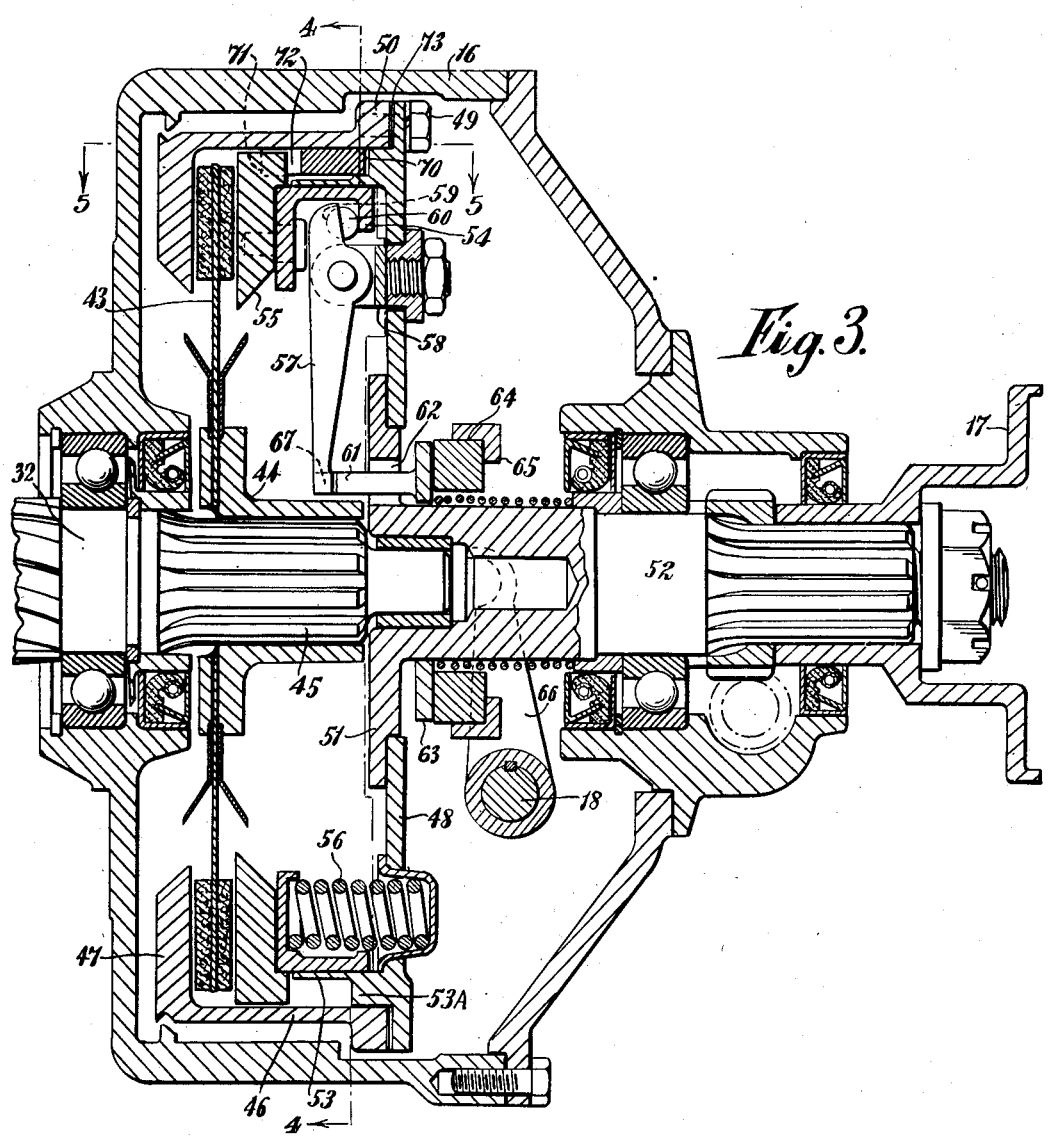

2,214,819

UNITED STATES PATENT OFFICE 2,214,819

VARIABLE-SPEED POWER-TRANSMISSION MECHANISM

Johann Nikolaus Kiep, Hamburg, Germany, and Harold Sinclair, Kensington, London, England, assignors to Hydraulic Coupling Patents Limited, London, England, a company of Great Britain Application December 23, 1938, Serial No. 247,413
In Great Britain December 23, 1937

11 Claims. (Cl. 74—340)

The present invention relates to power-transmission mechanism, such for example as the main power-transmission system of a motor vehicle, for connecting to a continuously-running driving motor a load having substantial inertia, the mechanism being of the type comprising a multi-ratio gearing having drive-engaging means which are incapable of progressive engagement, such as jaw clutches or sliding-mesh gear wheels, for establishing the different speed ratios, a friction clutch connecting the output shaft of said gearing to a driven member, and preferably a hydraulic power transmitter of the kinetic type (e. g. a hydraulic coupling), arranged to drive the input shaft of said gearing.

Heretofore mechanism of this type has suffered from the drawback that the friction clutch, which is required to transmit a very high maximum torque, would have had to be large and costly and would have been difficult to actuate.

An object of this invention is to provide power transmission mechanism of the type set forth which is easy to control, reliable, and relatively simple.

According to the present invention, in the improved power transmission mechanism of the type set forth, the friction clutch is provided with resilient engaging means which exert insufficient force to enable the clutch to transmit the maximum sustained driving torque to which it can be subjected under normal running conditions, torque-responsive means which serve to increase the engaging force automatically in the occurrence of driving torque thereon, and control means operable for disengaging the clutch.

The resilient engaging means conveniently comprise a spring or springs which impose an engaging pressure on the friction surfaces such as would enable the clutch to transmit only a part of the sustained torque to which it can be subjected on the lowest speed ratio, say, in a motor road vehicle between one-quarter and one-half of the lowest-gear torque corresponding to full engine torque. The torque-responsive means, which may include a toggle, cam or equivalent mechanism, or a coarse-pitch screw-and-nut or equivalent device, and which are arranged to transmit part or all of the torque applied to the clutch and to increase the engaging force acting on said friction surfaces in proportion to the increase in driving torque, should be so adjusted that the engaging force which they cause is of itself insufficient to prevent the clutch from slipping, but, when assisted by the spring force, will prevent slipping within the normal working range of driving torque.

The friction clutch may comprise torque-responsive means which serve to increase the engaging force automatically on the occurrence of over-running torque thereon, but at a lower rate than that at which the engaging force increases on the occurrence of driving torque thereon.

The invention will be further described with reference to the example shown in the accompanying drawings, in which:

Fig. 1 is a side elevation of part of the power transmission system of a road motor vehicle, Fig. 2 is a longitudinal vertical section of the gearing shown in Fig. 1, Fig. 3 is a longitudinal vertical section of the clutch when disengaged, Fig. 4 is a section on the line 4—4 in Fig. 3, Fig. 5 is a section, taken on the line 5—5 in Fig. 3, of a forward-drive toggle strut, and Fig. 6 is a section, corresponding to Fig. 5, but showing a reverse-drive toggle strut.

Referring to Fig. 1, the crankshaft 10 of an internal-combustion engine 11 is connected by a hydraulic coupling 12 of the kinetic type to the input shaft 13 of a mechanical countershaft change-speed gear 14 having a gear-changing control lever 15. The output shaft of the gearing is connected, through a friction clutch contained in a housing 16, to a driven shaft coupling 17. A control shaft 18 for disengaging the clutch is mounted in the housing 16 and is connected, by cranks 19 and 20 and a link 21, to a pedal 22 journalled on the casing of the gearing 14.

The gearing 14 (Fig. 2) is of conventional type yielding three forward speeds and reverse, the highest two speeds being engaged by a jaw clutch having an auxiliary synchronizing clutch. The input shaft 13 is integral with a gear wheel 23, jaw clutch teeth 24 and a male synchronising cone 25. The wheel 23 is in constant mesh with a gear wheel 26 which is fixed, together with gear wheels 27, 28 and 29, on a countershaft 30. The wheel 27 is in constant mesh with a second-speed wheel 31 journalled, but incapable of axial sliding, on the output shaft 32. A low-speed wheel 33 is slidably splined on the output shaft and can be engaged with the wheel 28 to yield low speed, and with an idler wheel (not shown) meshing with the wheel 29 to yield reverse. High speed (direct drive) and middle speed are engaged by a conventional double-ended jaw clutch having auxiliary synchronising friction clutches and without inertia-lock balking means. A female synchronising cone member 34 is slidable on axial splines on the shaft 32 and co-operates with the cone 25 and with a cone 35 on the wheel 31. The member 34 carries a plurality of radially slidable spring-loaded plunger balls, such as 36, housed in bores, such as 37, and co-operating with a circumferential groove 38 in a slidable jaw-clutch member 39 having internal splines 40 which are engaged with external splines 41 on the member 34 and which are alternatively engageable with the teeth 24 and with teeth 42 integral with the middle-speed wheel 31. The member 39 and the slidable wheel 33 are controlled by the gear lever 15 through selecting mechanism of well known type.

The friction clutch (Figs. 3 and 4), which is contained in the housing 16, comprises a driving disk 43 fixed to a hub 44 which is mounted on spline 45 on the gearing output shaft 32. The driven part of this clutch includes a drum 46, which has an inturned flange 47 forming an abutment plate for the driving disk, and an annular plate 48 fixed by screws 49 to a flange 50 on the drum 46, and also fixed to a flange 51 on a driven shaft 52 to which the coupling 17 is splined. The plate 48 is provided with a cylindrical flange 53 the inner surface of which guides a U section ring 54 which is fixed to a presser plate 55. A plurality of uniformly distributed compression springs 56 are arranged between the plates 48 and 55 and urge the presser plate 55 towards the abutment plate 47 so as to engage the driving disk 43.

The clutch disengaging mechanism includes three uniformly distributed radial levers 57. Each lever is pivotally mounted on a lug 58 and has at its outer end a circumferential groove 59 accommodating a ball 60 bearing against the inside face of the rear flange of the ring 54. This construction permits the presser plate 55 to move freely through a small angle of rotation relative to the remainder of the driven part while the levers 57 are loaded. The inner arms of the levers 57 are engaged through the agency of locating slots 67 in the ends of fingers 61 projecting axially through apertures, such as 62, in the flange 51 and integral with a thrust ring 63. A yoke 66 is fixed to the control shaft 18 and engages a thrust bearing consisting of a graphite ring 64 carried in a flanged trunnion ring 65.

The torque-responsive means are arranged as follows. Nine uniformly distributed rearwardly extending oblique recesses 70 are formed in the rear part 53A of the guide flange 53, which part is spigoted into the driven drum 46. Corresponding forwardly extending recesses 71 are formed in the outer border of the presser plate 55 (Fig. 5). Each pair of recesses 70 and 71 accommodates a forward-drive toggle strut 72 having rounded ends, the shape of the recesses being such that the strut can rock in a tangential plane. When the clutch is correctly adjusted, which operation is effected by inserting or removing shims 73 in or from the joint between the flange 50 and the plate 48, the longitudinal centre line of each strut 72 makes an angle θ of 30 degrees with a line parallel to the axis of the clutch, when the clutch is fully engaged, as in Fig. 5. Three reverse-drive toggle struts 76 (Fig. 6) are accommodated in uniformly distributed recesses 74 and 75, being arranged similarly to the struts 72 except that they are oppositely inclined and make an angle φ of 35 degrees with the longitudinal.

This device operates as follows. When the engine is idling and the vehicle is stationary, the drag of the hydraulic coupling 12 keeps the wheel 23, the countershaft 30 and the wheel 31 in rotation. If it is desired to engage first speed from rest, the pedal 22 is depressed to disengage the friction clutch and the gear lever 15 is moved so as to engage the sliding wheel 33 with the wheel 28, and thereby set in rotation the driving disk 43 of the friction clutch. The pedal 22 is now released and the engine is accelerated. The clutch springs 56 engage the clutch, but the engaging force which they exert is insufficient to enable the clutch to transmit more than about one-third of the low gear output torque corresponding to full engine torque. The clutch therefore begins to engage very gently. Part of the torque is transmitted from the driving disk 43 to the abutment plate 47 and thence through the drum 46 and the plate 48 to the driven shaft 52. The remainder of the torque is transmitted from the driving disk (acting in the sense indicated by the arrow in Fig. 5) to the presser plate 55, and thence through the struts 72 to the plate 48. These struts thus tend to rock forwards about their ends in the recesses 70 and in so doing they urge the presser plate 55 towards the abutment plate 47 and thereby supplement the engaging pressure, the combined effect of the struts 72 and the springs 56 enabling the clutch to transmit the maximum low gear torque that can be continuously generated.

As already mentioned, an important feature of this clutch is that the torque-responsive struts 72 exert an engaging force which, by itself, is insufficient to cause the torque transmission capacity of the clutch to increase as fast as the applied driving torque is increased. The clutch is able to transmit the applied driving torque because it is engaged by the joint effect of the constant force of the springs 56 and the variable force exerted by the struts 72. In consequence, if, for example, the pedal 22 is released to engage the clutch when the engine 11 is running excessively fast (under which condition the cushioning effect of the hydraulic coupling is not so apparent) the friction clutch will slip before the driving torque rises to an undesirably high value.

To change from first to second speed, the pedal 22 is depressed to disengage the clutch, the grooves 59 and balls 60 permitting the slight angular displacement of the presser plate 55, relative to the levers 57, that results from the increase in inclination of the struts 72. The lever 15 is now shifted in the ordinary way, disengaging the wheel 33 and urging the jaw clutch member 39 to the right. The balls 36 and the groove 38 co-operate to urge the synchronising cone member 34 to the right into engagement with the second-speed cone 35. The output shaft 32 and the clutch driving disk 43 are thereby synchronised with the second-speed wheel 31, and on completion of the movement of the lever 15, the member 39 meshes with the teeth 42. When the pedal 22 is released, the clutch re-engages and takes up the drive as hereinbefore described. The changes between the second and third speeds are made in a corresponding manner.

In order to change down to first speed while the vehicle is running, it is merely necessary to depress the pedal 22 and allow the engine to slow down to idling speed before completing the movement of the gear lever.

In order to reverse the vehicle, the clutch pedal 22 is depressed and the lever 15 is moved to engage the wheel 33 with the reverse idler. The clutch driving disk 43 is thereby caused to rotate backwards, and when the pedal is released the springs 56 gently engage the clutch. Part of the reversed torque in the clutch is transmitted from the driving disk (acting in the sense indicated by the arrow in Fig. 6) to the presser plate 55, and thence through the struts 76 to the plate 48, the struts 72 being unloaded. The struts 76 urge the presser plate 55 towards the abutment plate 47 and thereby supplement the engaging pressure.

It has been found convenient to make the driving torque transmission capacity somewhat greater than the reverse (and over-running) torque transmission capacity of the clutch.

The new arrangement has the following advantages.

Although the torque-actuated friction clutch is required to transmit in the lower gears a multiple of the engine torque, the control force required to operate it (e. g. pressure on a clutch pedal 22) is conveniently low, and when the clutch is being engaged under low torque conditions the take-up of the drive is smooth because the engaging pressure is low. Since the clutch is torque-actuated, however, it will not slip when driving in low gear at full power.

During gear changing while the vehicle is running and the engine speed is high, under which condition the cushioning effect of the hydraulic coupling is not so apparent, provided that, when the torque-actuated clutch is re-engaged, the engine speed is lower than it would be when the drive had been re-established on the next gear, this clutch will engage under over-running torque and consequently will produce an easy take-up of the drive. Similarly, if this clutch is engaged while the vehicle is running fast in gear with the engine idling or stopped, the objectionable forward lurch of the passengers and over-load on the transmission system in the over-running direction will be reduced.

Since the engaging pressure due to the torque is lower when driving in direct drive or second gear than when driving in bottom gear, the take-up of the drive may be uniformly smooth on all gears.

The torque-actuated clutch can be of small size in relation to its maximum torque capacity, since the hydraulic coupling provides the slip necessary for starting and running in traffic; and in consequence of its small size and the fact that its driving element is conveniently only a light disk, the moment of inertia of the parts to be accelerated or retarded during gear changing is low. Furthermore, on the lower-speed gears the speed of said parts is lower than that of the input shaft of the gearing. In the example shown in the drawings, which includes a gear of conventional design, the said parts are the output shaft 32, the wheel 33, the sliding members 34 and 39 of the synchronised jaw clutch, and the disk 43. Consequently the cheap and simple type of synchronised clutch shown operates satisfactorily, and first speed (or first and second speeds in a four-speed gearing) may be engaged by sliding pinions or plain jaw clutches without serious disadvantage.

The mechanism hereinbefore described may be modified by omitting the reverse gear from the gearing 14, for example where the system is intended for use in front of a separate forward and reverse gear such as is commonly used on a locomotive. In this case the actuating means responsive to reverse drive torque (e. g. the struts 76) may be omitted.

We claim:

1. A friction clutch for use with a gear type transmission and a hydraulic coupling and including resilient engaging means which exert insufficient force to enable the clutch to transmit the maximum sustained driving torque which it is designed to transmit, torque-responsive means which operates in parallel with said resilient engaging means and which serves to increase the engaging force automatically on the occurrence of driving torque through said clutch, and control means operable for disengaging the clutch, said torque responsive means being so arranged that the engaging force which it causes is of itself insufficient to prevent the clutch from slipping, but, when assisted by the force due to said resilient engaging means, will prevent slipping within the normal working range of driving torque.

2. A friction clutch for use behind a motor driven gear type transmission, said clutch comprising a driving friction element and two driven friction elements, resilient means for engaging said friction elements together and which exert insufficient force to enable the clutch to transmit the maximum sustained driving torque to which it can be subjected by said motor, torque-responsive means, which operates in parallel with said resilient engaging means and which connects only one of said driven friction elements to said driven member, said torque responsive means serving to increase the engaging force automatically on the occurrence of driving torque through said clutch and being so arranged that the engaging force which it causes is of itself insufficient to prevent the clutch from slipping, and control means operable for disengaging the clutch.

3. A friction clutch for use in a power transmission system, said clutch having resilient engaging means, torque-responsive means for increasing the engaging force automatically on the occurrence of driving torque through said clutch and also for increasing the engaging force automatically on the occurrence of over-running torque through said clutch but at a lower rate than that at which the engaging force increases on the occurrence of driving torque, and control means operable for disengaging said clutch.

4. A friction clutch having a body, a friction element displaceable axially of said body for engaging and disengaging said clutch, resilient engaging means for displacing said friction element in the engaging direction with insufficient force to enable the clutch to transmit the maximum sustained driving torque applied to it, means transmitting torque between said friction element and said body and constraining said friction element to move helically in the engaging direction in response to the application of driving torque, and control means which are operable for displacing said friction element in the disengaging direction and which include disengaging levers pivotally mounted on said body and rolling elements connecting said levers to said friction element and permitting relative angular displacement of said body and said friction element while said levers are loaded.

5. A friction clutch for use with a power driven gear type transmission comprising a body, a presser plate displaceable axially of said body for engaging and disengaging said clutch, resilient engaging means for displacing said presser plate in the engaging direction, a plurality of torque transmitting elements between said presser plate and said body, each of said elements being engaged with said presser plate and said body at points lying on a helix, the angle of which is such that said elements urge said presser plate in the engaging direction in response to the occurrence of driving torque in said clutch, but with a force insufficient in itself to prevent slipping of the clutch, and control means operable for displacing said presser plate in the disengaging direction.

6. A friction clutch for use with a power driven gear type transmission comprising a body, a presser plate displaceable axially of said body for engaging and disengaging said clutch, resilient engaging means for displacing said presser plate in the engaging direction, a plurality of pivotally mounted struts disposed obliquely between said presser plate and said body so as to urge said presser plate in the engaging direction in response to the occurrence of driving torque in said clutch, a plurality of pivotally mounted struts disposed obliquely between said presser plate and said body and inclined oppositely to said first-mentioned struts so as to urge said presser plate in the engaging direction in response to the occurrence of over-running torque in said clutch, and control means operable for displacing said presser plate in the disengaging direction.

7. A friction clutch for connecting an output shaft to a motor driven member, said friction clutch having resilient engaging means which exert insufficient force to enable said clutch to transmit the maximum sustained driving torque to which it can be subjected by the motor, engaging means which operates in parallel with said resilient means, which is responsive to the driving torque in said clutch and which by itself exerts insufficient force to prevent said clutch from slipping, said resilient engaging means and said torque-responsive means being capable when operating together of exerting sufficient engaging force to enable said clutch to transmit said maximum sustained driving torque, and control means operable for disengaging said clutch.

8. In a power-transmission system comprising a change-speed gearing driven by a motor through a hydraulic coupling and having an input shaft, an output shaft, positive drive-engaging means for establishing different speed ratios between said shafts, and auxiliary frictional synchronising devices associated with the positive drive-engaging means of at least the highest two speeds, and a friction clutch having a driving plate driven by said gearing and a driven body comprising resilient engaging means which exert insufficient force to enable said clutch to transmit the maximum sustained driving torque to which it can be subjected by the motor, engaging means operating in parallel with said resilient engaging means, and responsive to the driving torque in said clutch which by themselves exert insufficient force to prevent said clutch from slipping, said resilient engaging means and said torque-responsive means being capable when operating together of exerting sufficient engaging force to enable said clutch to transmit said maximum sustained driving torque, and control means operable for disengaging said clutch.

9. A power-transmission system comprising a change-speed gearing and a friction clutch at the power output side of the gearing, said change-speed gearing having aligned input and output shafts, a countershaft, a jaw clutch element fixed on said input shaft, a jaw clutch element journalled on said output shaft, a constant-mesh gear train including said countershaft and connecting said input shaft to said second-mentioned jaw clutch element, and a jaw clutch member slidable on but constrained to rotate with said output shaft and alternatively engageable with said jaw clutch elements, and said friction clutch having a body connected to said driven member, a driving plate connected to said output shaft, resilient engaging means, means responsive to driving torque transmitted through said clutch for supplementing the engaging force, and control means operable for disengaging said clutch.

10. A power-transmission system including a change-speed gearing and a friction clutch, said change-speed gearing having aligned input and output shafts, a countershaft, a jaw clutch element fixed on said input shaft, a jaw clutch element journalled on said output shaft, a constant-mesh gear train including said countershaft and connecting said input shaft to said second-mentioned jaw clutch element, a jaw clutch member slidable on but constrained to rotate with said output shaft and alternatively engageable with said jaw clutch elements, an auxiliary synchronising clutch associated with said slidable jaw clutch member and with each of said jaw clutch elements, and a gear-changing control member actuating said auxiliary clutches and said slidable jaw clutch member, and said friction clutch having a body connected to said driven member, a driving plate connected to said output shaft, a presser member operable for engaging said plate with said body, resilient means for actuating said presser member, means operating in parallel with said resilient engaging means and responsive to driving torque in said clutch supplementing the engaging force, and control means operable for disengaging said clutch.

11. A power-transmission system including in combination a change-speed gearing and a clutch driven thereby, said change-speed gearing having aligned input and output shafts, a countershaft, a jaw clutch element fixed on said input shaft, a jaw clutch element journalled on said output shaft, a constant-mesh gear train including said countershaft and connecting said input shaft to said second-mentioned jaw clutch element, a jaw clutch member slidable on but constrained to rotate with said output shaft and alternatively engageable with said jaw clutch elements, an auxiliary synchronising clutch associated with said slidable jaw clutch member and with each of said jaw clutch elements, and a gear-changing control member actuating said auxiliary clutches and said slidable jaw clutch member, and said friction clutch having a body connected to said driven member, a driving element connected to said output shaft, an axially displaceable driven element carried by said body, resilient means urging said driven element in the engaging direction, torque-responsive means connecting said driven element to said body so as to urge said driven element in the engaging direction in response to both driving and over-running torques but more strongly in response to any driving torque than to an over-running torque of the same magnitude, and control means operable for displacing said driven element in the disengaging direction.

JOHANN NIKOLAUS KIEP.
HAROLD SINCLAIR.